A. T. CARTER.
PROTECTIVE DEVICE FOR ELECTRIC INTERLOCKING SYSTEMS.
APPLICATION FILED MAY 1, 1917.
1,313,879.
Patented Aug. 26, 1919.
3 SHEETS—SHEET 1.
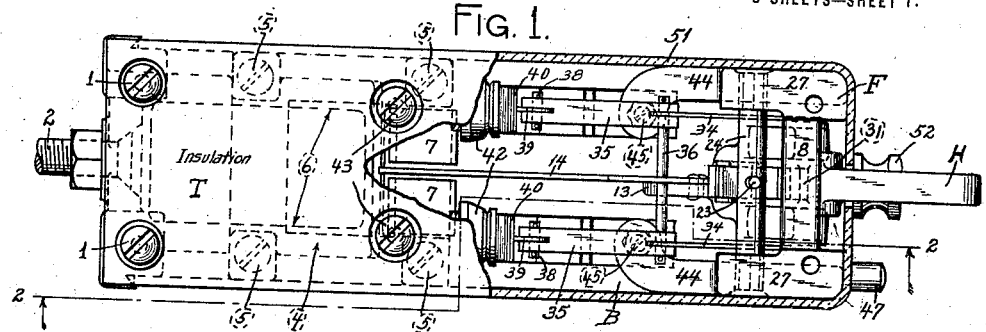
FIG. 1.
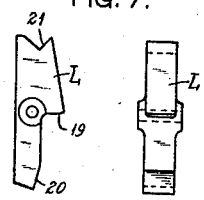
FIG. 7.
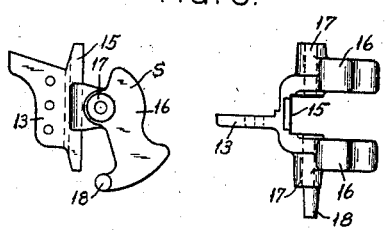
FIG. 8.
FIG. 9.
FIG. 2.
INVENTOR
Ainslie T. Carter
BY
Neil D. Preston
ATTORNEY A. T. CARTER.
PROTECTIVE DEVICE FOR ELECTRIC INTERLOCKING SYSTEMS.
APPLICATION FILED MAY 1, 1917.
1,313,879.
Patented Aug. 26, 1919.
3 SHEETS—SHEET 2.
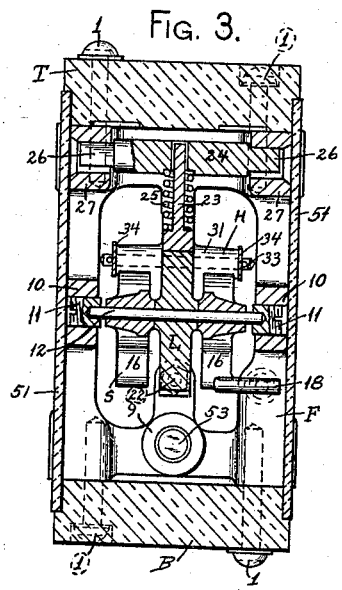
FIG. 3.
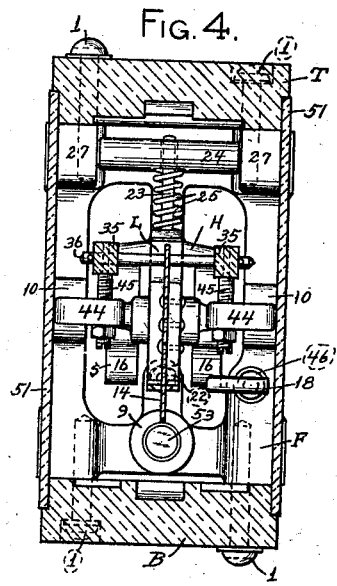
FIG. 4.
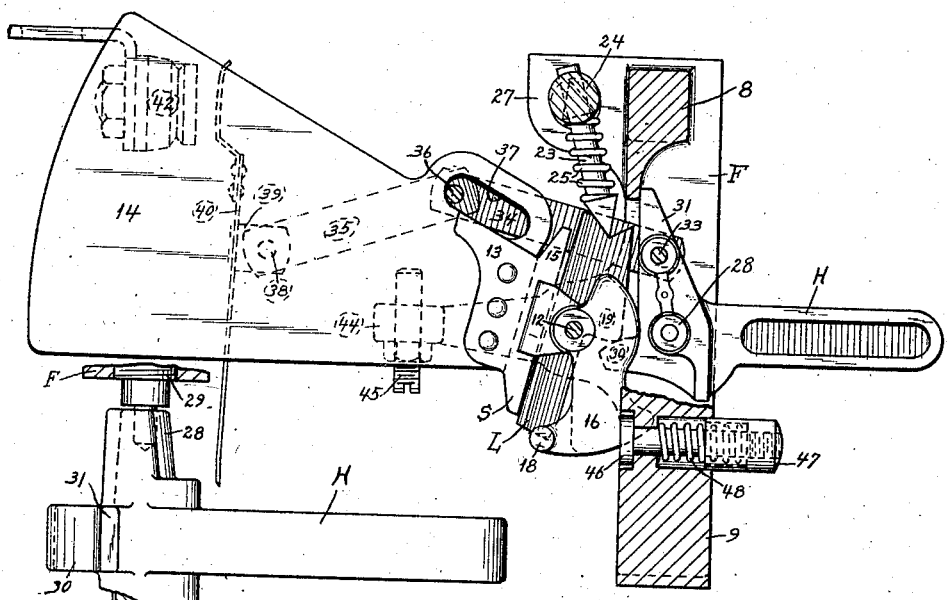
FIG. 5.
FIG. 6.
INVENTOR
Ainslie T. Carter
BY
Neil D. Preston
ATTORNEY

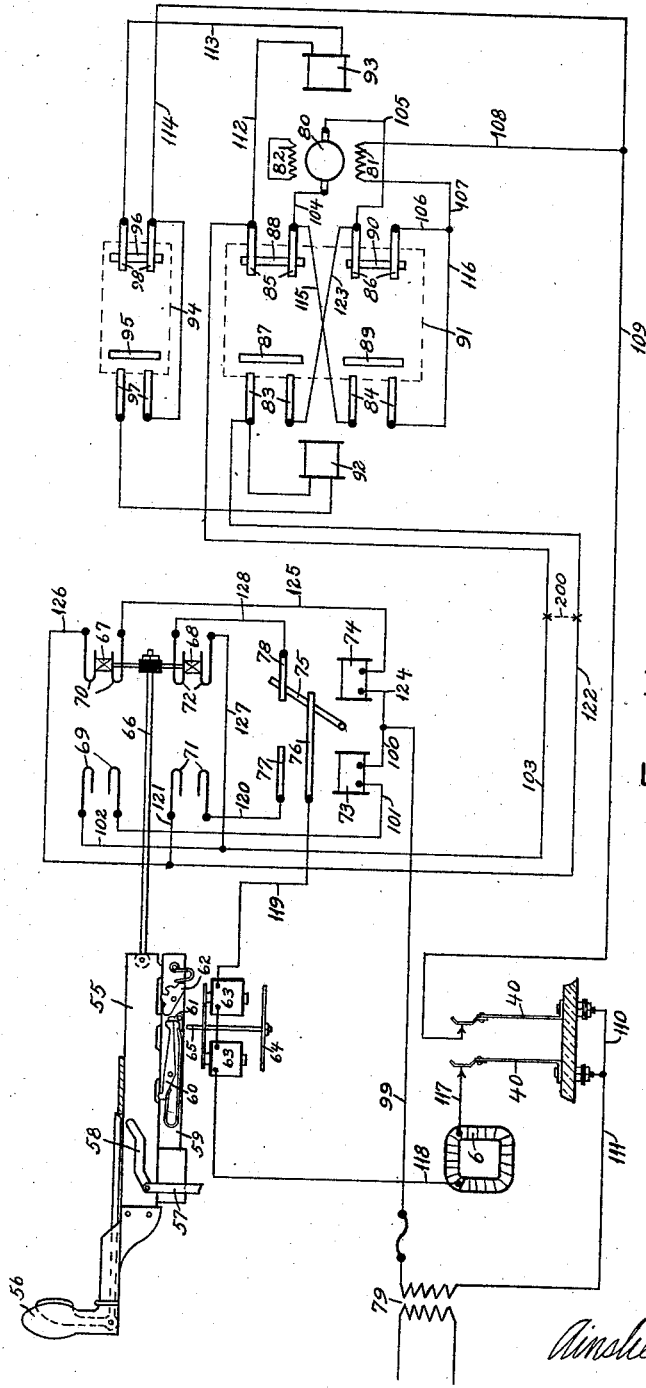

UNITED STATES PATENT OFFICE.

AINSLIE T. CARTER, OF ROCHESTER, NEW YORK, ASSIGNOR TO GENERAL RAILWAY SIGNAL COMPANY, OF GATES, NEW YORK, A CORPORATION OF NEW YORK.

PROTECTIVE DEVICE FOR ELECTRIC INTERLOCKING SYSTEMS.

1,313,879. Specification of Letters Patent. Patented Aug. 26, 1919.

Application filed May 1, 1917. Serial No. 165,691.

*To all whom it may concern:*

Be it known that I, AINSLIE T. CARTER, a citizen of the United States, and resident of the city of Rochester, in the county of Monroe and State of New York, have invented a new and useful Protective Device for Electric Interlocking Systems, of which the following is a specification.

This invention relates to electric interlocking systems for railroads, and more particularly to a protective device which is designed for use in connection with such systems operated by alternating current, and which is capable of protecting the system against improper operation of the parts or functions due to crosses between operating wires and similar derangements of the wiring and connections.

One of the principal objects of this invention is to devise a simple and reliable protective device which will effectively protect the function or functions under its control from improper operation due to crosses or the like.

A further object of the invention is to devise a protective device which can be restored to its normal condition after it has been automatically operated, but which cannot be manipulated accidentally or intentionally in such a way as to interfere with or destroy the protection which it gives.

A still further object of the invention is to devise a protective device which, after being automatically operated by an improper flow of current due to a cross or the like, cannot be permanently restored to nor held improperly in its normal condition to reëstablish a path for said improper flow of current, until the cross or other condition causing such improper flow of current has ceased to exist.

Other objects and advantages of the invention will appear more fully hereinafter during the description of the particular embodiment of the invention selected to explain its principles of operation and features of construction; and the novel features of the invention will be particularly pointed out in the appended claims.

In describing the invention in detail, reference is made to the accompanying drawings, in which is illustrated a preferred physical embodiment of the invention, in which like reference characters designate corresponding parts in the several views, and in which:

Figure 1 is a top plan view of the protective device embodying the invention, part of the upper part or casing of the device being broken away to show the parts underneath;

Fig. 2 is a vertical longitudinal section taken substantially on the line 2—2 in Fig. 1 and looking in the direction indicated by the arrows, part of the casing being removed;

Fig. 3 is a vertical transverse section through the protective device taken substantially on the line 3—3 in Fig. 2 and looking toward the right in the direction indicated by the arrows;

Fig. 4 is another vertical transverse section taken substantially on the line 4—4 in Fig. 2 and looking toward the right in the direction indicated by the arrows;

Fig. 5 is an enlarged view of some of the significant operating parts of the device detached and shown in the operated position;

Fig. 6 is a detail plan view of the handle constituting part of the protective device and shows the manner in which this handle is mounted, part of the handle being broken away;

Fig. 7 shows a side view and an edge view of a lever constituting a part of the protective device;

Fig. 8 shows a side view and a top plan view of a member constituting a part of the protective device and herein referred to as a vane support;

Fig. 9 shows a side and an end view of a shaft constituting part of the protective device;

Fig. 10 is a diagrammatic illustration, in the nature of a wiring diagram, showing the application of the protective device embodying the invention to a system of electric interlocking;

And Fig. 11 is a detail diagrammatic view of one of the contact-carrying blocks of the pole changer associated with the function.

Referring to the accompanying drawings, the protective device embodying the invention in general comprises a single element alternating current relay, specifically a relay of the vane type, together with associated contact devices adapted to be opened upon energization of the relay, and manually controlled restoring devices for permitting the closing of the contacts of the relay under safe conditions. The protective device as illustrated is formed with a box-like frame comprising two metallic end castings R and F, and top and bottom blocks of insulating material T and B, respectively, which are fastened to said end castings by screws 1. The top and bottom blocks T and B are for convenience in manufacture constructed the same. One of the end castings R is provided with a bolt 2 by means of which the entire protective device is secured to a suitable supporting panel, and for convenience this end of the protective device will be hereinafter termed the rear end.

The rear end casting R has formed integral therewith two side arms 3 which extend substantially parallel with each other toward the front end of the protective device. On the arms 3 is supported a stacking of laminations constituting a core 4 of a general rectangular shape, said core being fastened to the arms 3 by screws 5. One side of the core 4 carries a coil 6, and the limbs of the opposite side carry shade rings 7, in the same way and for the same purpose commonly employed in the construction of vane type relays.

The front end casting F has the general form of a hollow square, as shown in Figs. 3 and 4, and consists of vertical side members connected by integral upper and lower cross members 8 and 9, respectively. Integral with the side members of the front end casting F are rearwardly extending lugs 10 (see Figs. 3 and 4); and screwed into holes in said lugs 10 are bearing screws 11 which form supports for the ends of a transverse pin or shaft 12. Mounted on the transverse shaft 12 is a member designated as a whole by the letter S and herein referred to as the vane support, this member being shown detached in Fig. 8. As illustrated, this vane support S comprises a flange 13 to which is riveted or otherwise suitably fastened a sector-shaped vane 14, the free end of the vane passing between the pole pieces of the core 4 in the usual way. The vane support S is also formed with upwardly and downwardly extending projections 15, formed with flat contacting surfaces for the purpose hereinafter explained; and the vane support S further comprises bifurcations 16, including integral hubs 17 through which the shaft 12 passes. One of the bifurcations 16 has integral therewith a laterally extending pin 18 for the purpose hereinafter described.

Also mounted on the shaft 12 between the arms 15 of the vane support S is a lever L, shown detached in Fig. 7. This lever L is formed with a curved shoulder 19 near its middle, an inclined face 20 near its lower end and a V-shaped notch 21 in its upper end. When the parts of the protective device are in their normal position, as shown in Fig. 2, the inclined face 20 of the lever L bears against an adjustable stop pin 22 secured in the lower cross member 9 of the front end casting F. Disposed above the lever L is a plunger 23 which is provided with a V-shaped head engaging the notch 21 in said lever, and which passes loosely through a transverse hole in a shaft 24, a compression coil spring 25 surrounding said plunger being interposed between its head and said shaft, as clearly shown in Figs. 2 and 5. The shaft 24 extends transversely of the protective device and is formed at its ends with knife edge bearings 26 which bear against the edges of holes formed in lugs 27 projecting rearwardly from the upper cross member 8 of the front end casting F (see Figs. 3 and 5).

Located in front of the vane support S and the lever L, and also supported so as to turn about a horizontal axis, is the restoring handle designated as a whole by the letter H. This restoring handle H is formed with hubs or bosses 28 (see Fig. 6) which are journaled on pivot pins 29 adjustably mounted in the side members of the front end casting F. The restoring handle H is provided with a rearwardly extending lip or lug 30, the upper face of which is curved and is adapted to engage with the curved shoulder 19 of the lever L. The shoulder 19 and the lip 30 are preferably shaped in accordance with the same principles governing the shape of gear teeth in order that as little friction as possible will occur when the restoring handle H and the lever L rock on their respective axes. The restoring handle H is also provided with an integral upstanding projecting portion 31, the upper end of which is adapted to strike the lower edge of the upper cross member 8 of the end casting F, as shown in Figs. 2 and 5. Surrounding one of the pivot pins 29 is a torsion spring 32, one end of which is anchored to the handle H, and the other end of which is anchored to the front end casting F, as clearly shown in Fig. 6.

The upward projecting portion 31 of the handle H is provided with a transverse bore in which is mounted a pin 33, (see Figs. 2, 3 and 5) the ends of which extend beyond said member 31 and constitute pivot pins for the ends of two links 34 (see Fig. 3), suitable pins or retaining devices being inserted through the pin 33 to hold said links in place. The pair of links 34 extend substantially parallel rearwardly from the handle H and at their rear ends are disposed in slots formed in the ends of another pair of links 35; and a pin 36 passing through the ends of both pairs of links 34 and 35 (see Fig. 1) and held in place by small transverse pins or other means forms a pivotal connection between the adjacent ends of pairs of links 34 and 35. The pin 36 also passes through an elongated slot 37 formed in the vane 14 (see Figs. 2 and 5). The rear ends of the pair of links 35 are also slotted and are pivotally connected by pins 38 (see Figs. 1 and 2) to small brackets 39 fixed to contact fingers 40. The contact fingers 40 are arranged substantially vertical and are fastened at their lower ends to the bottom insulating block B by binding post 41; and the upper ends of the contact fingers 40 are adapted to make electrical contact with contact pieces 42 fastened to angle-shaped conducting bars which are in turn secured to the top insulating block T by bolts 43 or other suitable fastening means, said angle-shaped pieces being preferably formed with slots through which the bolts 43 pass so as to facilitate adjustment of the contact pressure by adjusting said angle-shaped pieces rather than by bending the contact fingers 40. Extending rearwardly from the front end casting F are two parallel side brackets 44 in which are adjustably mounted screw stops 45, said stops 45 being located immediately below the links 35 (see Fig. 4) near the front end of said links.

It is sometimes desirable for various reasons to be able to manually trip the protective device and open its contacts; and for this purpose a plunger 46 (see Fig. 5) is carried by one of the side members of the front end casting F in a position such that its enlarged head will strike against the pin 18 integral with the vane support S. Fastened to the forwardly extending end of the plunger 46 is a button 47, and surrounding the plunger 46 is a compression spring 48 which bears at one end against the button 47 and at its other end against the bottom of a recess in the outer face of said side member.

In order to prevent unauthorized interference with the protective device, the operating parts thereof are preferably inclosed. The construction of the main skeleton or frame work of the protective device incloses the operating parts on the top and bottom, and the rear end, but leaves the two sides and the front end open. These two sides and front end are preferably covered by a cover 51 having a general U-shape which is slid in rabbets formed in the top and bottom insulating blocks T and B. This cover 51 is preferably held in place by transversely extending lugs at the top and bottom of rear casting R, said lugs having vertically extending grooves in them adjacent to the outer ends of the vertical members of rear casting R, and by a nut 52 threaded on a pin 53 secured in the portion 9 of the front end casting F. There is also preferably provided a wire 54 passing through a small transverse hole in the outer end of the pin 54 having its ends sealed, thereby preventing unauthorized removal of the nut 52.

In Fig. 10 is shown diagrammatically an application of the protective device hereinbefore described to one system of electric interlocking. In this system of electric interlocking, each switch, signal or other part controlled by the interlocking plant, which are commonly termed functions, is controlled by a slidable bar 55, commonly termed a lever, which is provided with a suitable handle 56 for facilitating its manual operation. Only one lever 55 and its associated parts are shown in Fig. 10, and it is to be understood that in practice there are several such levers in each interlocking plant, and that each lever and its associated parts constitutes a unit suitable for controlling one of the functions. The different levers 55 of the interlocking plant are interlocked by any suitable form of mechanical interlocking well known in the art, and this mechanical interlocking is actuated by each lever 55 by means of a link 57, the upper end of which carries a roller engaging with a cam slot 58 formed in the body of the lever 55, whereby the reciprocating movement of the lever 55 causes a vertical movement of the link 57 and its connected parts.

The lever 55 is supported by a suitable frame or guide 59, and on this guide is pivoted a spring pressed latch 60, said latch being arranged so that when its righthand end is raised, that end will coöperate with certain shoulders formed in the lower edge of the lever 55 so as to limit the longitudinal movement of said lever in certain of its positions. Also pivoted to the guide 59 is a dog 61 which is arranged to catch under the righthand end of the latch 60 and hold said latch in its upper locking position; and arranged so as to swing the dog 61 under the latch 60 is a cam or tumbler 62 which is pivoted to the guide 59 and is provided with up-standing teeth adapted to be engaged by teeth along the under edge of the lever 55, so that said cam is rocked as said lever is moved back and forth. Below the dog 61 is arranged a pair of coils 63 constituting an indication magnet I. This indication magnet I is preferably of the type shown and described in the application of Frank T. Casper Serial Number 159,201, filed April 2, 1917. The armature 64 of the indication magnet I is connected to a rod 65 which extends upwardly into position to strike the dog 61 and trip it out of engagement with the latch 60 when said armature 64 is attracted upwardly by coils 63.

The lever 55 is arranged to open and close certain circuits at certain positions in its movement, and for this purpose there is connected to said lever a rod 66, to which are attached two metallic contact blocks 67 and 68 insulated from each other. Four pairs of contact springs 69, 70, 71 and 72 are arranged to coöperate with the contact blocks 67 and 68 as the lever 55 is moved back and forth.

The lever 55 has four significant positions:

1st, its innermost position, as shown in Fig. 10, which is conveniently termed the normal position;

2nd, an outermost position, which is conveniently termed the reverse position;

3rd, a position near the innermost or normal position in which the contact blocks 67 and 68 are in contact with the corresponding pairs of contact springs 70 and 72, but in which the link 57 has not been forced downward by the cam slot 58 to its lowermost position, this position of the lever being conveniently termed the normal indication position; and 4th, a position near the outermost or reverse position in which the contact blocks 67 and 68 are in contact with the corresponding pairs of contact springs 69 and 71, but in which the link 57 has not been raised to its uppermost position, this position of the lever being conveniently termed the reverse indication position.

A further description in detail of the construction of the parts associated with the interlocking lever is not deemed necessary for a clear understanding of the construction and operation of the protective device embodying this invention.

Supported in any suitable way adjacent to the lever 55 is an indication selector comprising two electromagnets 73 and 74 between which a contact bar 75 of magnetic material is pivoted at one end so as to be rocked back and forth by the attraction of said electromagnets. The contact bar 75 is in contact with a strip 76 at all times and with strips 77 and 78, respectively, in the two extremes of its movement.

The parts of the electric interlocking system shown in Fig. 10 so far described are located in a tower or cabin, in which is also located a suitable source of alternating current, as a transformer 79; and associated with each unit lever 55 is the protective device shown in Figs. 1 to 9 inclusive and hereinbefore described. In Fig. 10 the protective device has been illustrated diagrammatically, only the coil 6 and the two contact springs 40 being illustrated.

In Fig. 10, the unit lever 55 and its associated parts are shown as used for operating a switch, but it is to be understood that the protective device embodying this invention is applicable in the same way to cases where a signal or other function is operated. The mechanism for operating the switch is shown diagrammatically and is preferably of the type shown and described in the patent to Winthrop K. Howe, No. 1,288,595, dated December 24, 1918. This operating mechanism comprises an electric motor M illustrated as including an armature 80, an operating field 81 and a compensating field 82. This operating motor M is of any suitable type which is capable of being operated by alternating current in one direction or the other upon reversal of the connections to its field or armature and which is also capable of generating dynamically a direct current when its armature rotates idly after each operation of the function.

The supply of current to the motor M is controlled by a circuit controlling device, commonly termed a pole changer, which comprises four pairs of contact springs 83, 84, 85 and 86 and movable contact pieces 87, 88, 89 and 90 carried by a contact-carrying block 91 of insulating material. The contact-carrying block 91 is operated mechanically in correspondence with the movements of the switch, in the manner shown and described in detail in the above mentioned patent. This contact-carrying block 91 is also arranged to be operated electrically by pole changer operating coils 92 and 93. Also forming a part of the pole changer is another contact-carrying block 94 upon which are supported two contact pieces 95 and 96 which are adapted to make electric contact with pairs of contact springs 97 and 98 in different moved positions of said contact-carrying block 94. The contact-carrying block 94 is operated mechanically in correspondence with the movement of the operating parts of the switch machine.

Referring to Fig. 11, which shows a diagrammatic end view of this contact-carrying block 94 and its associated contact springs, the construction of the parts for operating this contact-carrying block is such, as shown and described in the above mentioned patent, that during the first unlocking movement of the switch machine, said block 94 is shifted from one extreme position to its intermediate position in which its contact pieces 95 and 96 respectively touch the pairs of contact springs 97 and 98. During the final locking movement of the switch machine, the contact-carrying block 94 is shifted mechanically to the opposite extreme position, where its contact pieces 95 and 96 are out of contact with both of the pairs of contact springs 97 and 98.

In order to make clear the functions performed by the protective device embodying this invention, the operation of the system of electric interlocking shown diagrammatically in Fig. 10 will first be described under normal operating conditions, and then the operation of the protective device under abnormal operating conditions will be pointed out. Assuming the parts of the interlocking system to be in their normal position as shown in Fig. 10, when the lever 55 is pulled out toward its reverse position, it may be moved without opposition to the point where the contact blocks 67 and 68 touch the pairs of contact springs 69 and 71, but before the full reverse position of the lever 55 is reached, the latch 60 arrests its movement in the reverse indication position. When the contact block 67 of the lever touches the contact springs 69, current will flow in an operating circuit which may be traced as follows: Commencing at the transformer 79 conductors 99 and 100, indication selector electromagnet 73, conductor 101, contact springs 69 and contact block 67, conductors 102 and 103, contact springs 85 and contact piece 88, conductor 104, armature 80 of the operating motor M, conductor 105, contact springs 86 and contact piece 90, conductors 106 and 107, operating field 81 of the motor, conductors 108 and 109, contact finger 40 of the protective device, jumper 110, and conductor 111 back to the transformer 79.

The circuit just traced supplies current to the operating motor and causes it to commence the operating movement of the switch machine. During the first part of the unlocking movement of the switch machine, the contact-carrying block 94 is shifted to its intermediate position, whereupon current may also flow through the pole changer operating coil 93 in a branch circuit which may be traced as follows: Commencing at the contact spring 85 to which the conductor 103 is connected, conductor 112, pole changer operating coil 93, conductor 113, contact springs 98 and contact piece 96, conductor 114 to the conductor 109 and thence back to the transformer 79, along the same path as hereinbefore traced. The purpose of energizing the pole changer operating coil 93 is fully set forth in the Patent Number 800,246, hereinbefore referred to. The circuit above traced also causes current to flow through the indication selector magnet 73 which attracts the contact bar 75 from the position shown in Fig. 10 to its opposite position where it establishes electrical connection between the contact strips 76 and 77.

After the switch machine has operated to throw the switch, during the final locking movement, the contact-carrying blocks 91 and 94 of the pole changer are shifted mechanically by the mechanism of the switch machine from their existing positions to the other extreme positions, opposite to that shown in Fig. 10. The movement of the contact-carrying block 94 interrupts the branch circuit through the pole changer operating coil 93, and the movement of the contact-carrying block 91 interrupts the circuit supplying current to the operating motor M. The armature 80 of the motor M, however, continues to rotate due to its acquiring momentum and generates a direct current which flows in an indication circuit which may be traced as follows: Commencing at one brush of the armature 80, conductors 104 and 115, contact springs 84 and contact piece 89, conductors 116 and 107, operating field 81, conductors 108 and 109, one contact finger 40 of the protective device, jumper 110, the other contact finger 40 of the protective device, conductor 117, coil 6 of the protective device, conductor 118, coils 63 of the indication magnet I, conductor 119, contact strip 76, contact bar 75, contact strip 77, conductor 120, contact springs 71 and contact block 68, conductors 121 and 122, contact springs 83 and contact piece 87 and conductors 123 and 105 back to the other brush of the armature 80 of the motor. This direct current, generated dynamically by the rotation of the armature 80 of the operating motor M, flows through the coil 63 of the indication magnet I, and being direct current, is effective to lift the armature 64 and trip the dog 61, thereby releasing the latch 60 and permitting the lever 55 to be moved to its full reverse position. The indication current also flows through the coil 6 of the protective device, but since this protective device is responsive only to alternating current, no effect is produced.

It will be noted that in the operation just described, the pole changer operating coils 92 and 93 are connected through the pairs of contact springs 97 and 98 and the contact pieces 95 and 96 to the conductor 114 connected to the return conductor 109 after the first unlocking movement of the switch machine, so that these pole changer operating coils may be used to reverse the switch in mid-stroke, if necessary, but that these pole changer operating coils are disconnected from the conductor 114 during the final locking movement of the switch machine and prior to the establishing of the indication circuit. This part of the operation of the interlocking system results from changing the contact springs 97 and 98 so that they make contact with the contact pieces 95 and 96 only when the contact-carrying block 94 is in its intermediate position. Referring to Fig. 10, it can be seen that, if the pole changer operating coil 92 were connected to the conductor 114 when the indication circuit hereinbefore traced is established, the branch circuit through this coil 94 would form a conducting path in parallel with the indication magnet I and would deprive said indication magnet of part of the indication current. Where the switch machine is operated by direct current, the pole changer operating coils may be made of high ohmic resistance so that their shunting effect upon the indication magnet I is practically negligible; but where alternating current is used for operating the switch machine, the high reactance factor of the pole changer operating coils to alternating current makes it necessary to make these coils of comparatively low ohmic resistance so that they would rob the indication magnet I of a large proportion of the indication current, which is direct current, if these coils were included in the indication circuit in multiple with the indication magnet. Consequently, in an interlocking system which is operated by alternating current, it becomes important to use some suitable arrangement and construction of parts to disconnect the pole changer operating coils during the indicating operation.

The operation of moving the switch from its reverse position back to the normal position is substantially the same as hereinbefore described, and the circuits for this other operation may be readily traced from analogy to the circuits already explained.

With this brief description of the operation of the electric interlocking system shown in Fig. 10 under normal operating conditions, it is now possible to explain more clearly the functions performed by the protective device embodying this invention in preventing false or improper operation of the function under abnormal conditions, such as may be produced by crosses or grounds, or the like. One assumption will serve to illustrate the action and operation of the protective device, and for a simple instance assume an electrical connection is falsely made between the two control wires 103 and 122, as indicated by the two crosses and dash line 200 in Fig. 10. This improper connection, or cross, between the two control wires may be due to the breaking down of the insulation which permits current to flow from one control wire to the other, or may be due to any other causes which result in a conducting path being established between said two control wires.

Assuming the parts of the interlocking system to be in their normal position shown in Fig. 10, the occurrence of the cross 200 has a tendency to cause an improper operation of the switch and place it out of correspondence with its lever. To illustrate, disregarding for the moment the action of the protective device, it can be seen that current may flow from the transformer 79 out to the motor of the switch machine and cause it to reverse the switch, due to the existence of a circuit which may be traced as follows: Commencing at the transformer 79, conductors 99 and 124, indication selector electromagnet 74, conductor 125, contact springs 70, contact block 67, conductors 126, and 122 to the point where the cross 200 is located, thence along the path of the cross to the conductor 103, thence through the contact springs 85 and the contact piece 88, conductor 104, armature 80, conductor 105, contact springs 86 and contact piece 90, conductors 106 and 107, operating field 81, conductors 108 and 109, contact finger 40 of the protective device, jumper 110 and conductor 111 back to the transformer 79.

From the foregoing it is apparent that, unless means is provided for interrupting the last traced circuit at some point, the motor can be operated to move the switch out of correspondence with its lever, thereby resulting in a dangerous condition; and one of the important functions performed by the protective device is to prevent false and improper operation of the switch under such conditions as described. Referring to the circuit last traced, there is established by the cross 200 another conducting path along which current may flow back through the apparatus in the tower as follows: Commencing at the cross 200, conductors 103 and 127, contact springs 72 and contact block 68, conductor 128, contact strip 78, contact bar 75, contact strip 76, conductor 119, coils 63 of the indication magnet I, conductor 118, coil 6 of the protective device, conductor 117, contact finger 40 of the protective device, and conductor 111 back to the transformer 79.

The conducting path just traced, which is set up under abnormal conditions by the occurrence of a cross, such as the cross 200, results in alternating current being supplied to the coil 6 of the protective device, and this energization of the coil 6 causes the opening of the contact fingers 40, in a manner to be more fully explained hereinafter, so as to interrupt the circuit for improperly supplying current to operate the function and also the circuit through the coil 6. The protective device acts quickly upon the occurrence of a cross and consequently prevents current being supplied to the function long enough to produce any improper operation thereof. It will be noted that the energization of the coil 6 by alternating current results in the breaking of the circuit through said coil, and in this way injury of the indication magnet I and the coil 6 by the continued flow of abnormally large current, and also any other objectionable effects resulting from the continued flow of current through the coil 6, are obviated.

Referring now particularly to the operation of the protective device embodying this invention, the parts of this device are shown in their normal position in Figs. 1, 2, 3 and 4, and in the operated position in Fig. 5. When the parts are in the normal position, the vane 14 is in its lower position and due to the coöperation of the slot 37 therein with the pin 36, the pairs of links 35 and 34 are moved downward to the position shown in Fig. 2 where the links 35 engage the screw stops 45. The righthand or front ends of the links 34 are held against movement by the spring 32 associated with the handle H, and these screw stops 45 are so adjusted that the point of the pivotal connection between the pairs of links 35 and 34 is below the line connecting the pivotal points of the ends of said pairs of links, so that the contact fingers 40 are pressed tightly against their coöperating contact pieces 42, in accordance with the principle of the well known toggle joint. The lever L is held by the spring-pressed plunger 23 in the position shown in Fig. 2 where its inclined face 20 bears against the stop pin 22 and this stop pin 22 is preferably adjusted so that the upper end of the lever L does not quite touch the upper projection 15 of the vane support S, for the reason explained hereinafter.

When alternating current flows through the coil 6, the vane 14 is attracted upward in accordance with the principles governing the operation of the well known vane type relay, and after a certain amount of idle or free movement due to the width of the slot 37 and the clearance between the projection 15 of the vane support S and the lever L, said upward projection 15 strikes the lever L and moves the upper end of said lever to the right. Due to the relative proportion of the parts and the relative positions which they assume, this movement of the upper end of the lever L to the right results in the compression of the spring 25 during the first part of this movement of said lever, that is, until the point of contact between the V-shaped head of the plunger 33 and the V-shaped notch 21 in the lever L is offset at the right from the line connecting the axis of the shaft 24 and the axis of the shaft 12. After the lever L has been moved by the vane 14 beyond this critical position, the tension of the spring 25 is exerted to continue further movement of said vane and lever. As the vane 14 moves upward, the lower edge of the slot 37 therein engages the pin 36 and carries the point of pivotal connection between the pairs of links 35 and 34 above the line connecting the pivotal points of the ends of said links, whereupon the contact fingers 40 commence to move to the right. This movement of the parts continues until the contact fingers 40 are opened and the parts assume the positions substantially as shown in Fig. 5. As explained hereinbefore, the opening of one of the contact fingers 40 interrupts the flow of alternating current through the coil 6, but the parts are held in their operated position by the spring 25.

To restore the protective device to its normal condition, the operator presses downward on the handle H, and the lug 30 of this handle engages with the curved shoulder 19 of the lever L (see Fig. 5) and causes the upper end of said lever to be moved in a counter-clockwise direction, as viewed in Fig. 5, against the opposition of the spring 25, thereby permitting the vane 14 to move downward and bring the pairs of links 34 and 35 substantially into alinement. In moving the handle H downward, however, the pin 33 and the righthand ends of the pair of links 34 are moved to the right, so that, although the pairs of links 34 and 35 are straightened, the contact fingers 40 are still held opened; and this condition will exist so long as downward pressure is maintained on the handle H. When the operator releases the handle H, the spring 32, aided by the resiliency of the contact fingers 40, restores the parts to the normal position shown in Fig. 2. In case the cross, ground or the like, which previously caused the flow of alternating current through the coil 6 of the protective device, still exists, the vane 14 is immediately moved upward, and the same movement and operation of the parts hereinbefore described is produced to cause immediate opening of the contact fingers 40. It should be noted that the operator cannot prevent this second operation, because any attempt on his part to move the handle H upward, so as to keep the contact fingers 40 closed, is of no avail, and any attempt on his part to prevent this operation by moving the handle H downward only results in the earlier opening of the contact fingers 40. The same operations will be repeated so long as the cross, ground or the like exists and so long as the operator attempts to restore the protective device.

From the foregoing it can be seen that after the protective device has operated, the circuits which it opens cannot again be closed until the parts of the protective device are in such a position as to be immediately capable of reopening these circuits. Consequently, the operator of the interlocking plant cannot carelessly or maliciously restore a protective device while the cross, ground or the like exists, nor can he maliciously prevent the proper operation of the protective device or detract from its efficiency by manipulation or by maliciously fastening down the handle H.

In some cases, where repairs are to be made, or for some other reason, it may be desired to trip the protective device manually. As pointed out hereinbefore, the downward movement of the handle H, when the parts are in their normal position, causes an opening of the contact fingers 40, but in order to maintain these contact fingers opened it is necessary to fasten or hold down the handle H. To avoid this trouble and annoyance, the manually operable plunger 46 is provided. When this plunger 46 is pressed inward by the operator against the opposition of the spring 48, the parts being in the normal position as shown in Fig. 4, the head of said plunger engages the laterally projecting pin 18 of the vane support S and causes clockwise movement, as viewed in Fig. 4, of said vane support and the lever L, with the result of tripping the protective device in the same way as if alternating current were to flow through the coil 6. After the protective device has been tripped manually in this way, it may be restored to its normal condition in the same way as hereinbefore described.

Various modifications and changes may be made in the particular form of construction and arrangement of parts of the protective device shown and described without materially changing the functions and advantages of the device, and without departing from my invention. While the protective device has been illustrated as arranged so as to disconnect only the particular function affected by a cross, it is obvious that the same scheme may be extended to include the whole interlocking plant or any section or sections thereof. Also the protective device embodying this invention is susceptible of application to electric interlocking systems of other types other than the particular system shown and described. Consequently, while I have described the construction and operation of one physical embodiment of my invention, I desire to have it understood that this particular embodiment selected is merely illustrative and does not exhaust the possible physical embodiments of the idea of means underlying my invention.

What I claim as new and desire to secure by Letters Patent of the United States, is:

1. A protective device for electric interlocking systems comprising an electromagnetic device including a movable member, a handle for restoring said movable member to its normal position, a fixed contact piece and a coöperating movable contact finger, two links having their adjacent ends pivotally connected and having their opposite ends connected to said contact finger and said handle respectively, said links being substantially in alinement when contact finger is in its closed position, the restoring movement of said handle causing bodily movement of the links to move said contact finger to its open position, and means operatively connecting said movable member and said links and acting upon movement of said movable member to its operated position to throw the links out of alinement and to move the contact finger to its open position.

2. A protective device for electric interlocking systems comprising a fixed contact piece and a coöperating movable contact finger, an electromagnetic device including a movable member, pivotally connected links operatively connected to said contact finger and controlling the movement thereof, means constituting an operative connection between said movable member and said links, and an over-center throwing device associated with said movable member.

3. A protective device for electric interlocking systems comprising an electromagnetic device including a movable member, a movable contact finger, pivotally connected links operatively connected to said contact finger and controlling the movement thereof, resilient means tending to move said links out of alinement in either direction, a fixed stop for preventing movement of said links substantially out of alinement in one direction, and means connecting said movable member and said links and adapted to cause movement of said links out of alinement in the other direction away from said stop.

4. A protective device for electric interlocking systems comprising a normally closed circuit controller, an electromagnetic device including an operating coil and a movable member for opening said circuit controller upon energization of the coil, and manually operable means for restoring said movable member to its normal position, said means acting to maintain said circuit controller in its open position independently of said movable member.

5. A protective device for electric interlocking systems comprising a circuit controller, electromagnetic means including a movable member for opening said circuit controller, and resiliently controlled means adapted to hold said movable member in its normal position and acting after a predetermined movement thereof to move said movable member to open said circuit controller and to hold it in said open position.

6. A protective device for electric interlocking systems comprising a circuit controller, an electromagnetic device including an operating coil and a movable member for governing the movement of said circuit controller, and an over-center throwing device associated with said movable member.

7. A protective device for electric interlocking systems comprising a circuit controller, electromagnetic means including a movable member for operating said circuit controller, resilient means controlling the movement of said movable member, said resilient means tending to hold said circuit controller in its closed position and acting after a predetermined movement thereof to move said circuit controller to its open position, and manually operable means for restoring said movable member to its normal position, said manually operable means while in its operated position acting to maintain said circuit controller in its open position.

8. In an electric interlocking system, in combination: a source of alternating current; a function adapted to be operated by alternating current; a return connection from said function to said source; a circuit closed when said function is at rest, a circuit controller included in said return connection; an electromagnetic device comprising an operating coil included in said circuit and a movable member, said movable member being operated by the flow of alternating current in the operating coil to open said circuit controller; and manually operable means for restoring said movable member to its normal position after the operation thereof, said manually operable means while in its restoring position acting to hold said circuit controller open.

9. In an electric interlocking system, in combination: a source of alternating current; an electrically operable function including a motor adapted to be operated by alternating current and to generate direct current dynamically after each operation of the function; a return connection from said function to said source; an indication mechanism; a conducting path for current to flow from said return connection through said indication mechanism; circuit controlling means for interrupting said return connection and said conducting path; electromagnetic means for opening said circuit controlling means when alternating current flows in said conducting path; and means associated with said electromagnetic means for mechanically holding said circuit controlling means in its open position.

AINSLIE T. CARTER.

Copies of this patent may be obtained for five cents each, by addressing the "Commissioner of Patents, Washington, D. C."